UNITED STATES PATENT OFFICE.

JOSEPH A. GREER AND PETER O'HAIR, OF STERLING, ILLINOIS.

IMPROVEMENT IN ARTIFICIAL STONE.

Specification forming part of Letters Patent No. 212,686, dated February 25, 1879; application filed December 27, 1878.

*To all whom it may concern:*

Be it known that we, JOSEPH A. GREER and PETER O'HAIR, of the city of Sterling, in the county of Whiteside and State of Illinois, have invented certain new and useful Improvements in the Mode of Making Artificial Stone; and we do hereby declare that the following is a full, clear, and exact description of the invention, which will enable others skilled in the art to which it appertains to make and use the same.

Our invention relates to an improved compound for artificial stone for building and ornamental purposes.

To use our invention, proceed as follows: Take of clean sand, six parts; of stone-chippings, three parts; of Portland cement, one part; of gypsum, one part; of alumina, three parts. These are thoroughly mixed, and then moistened with the following solution: two per cent. of carbonate of magnesia, one per cent. of carbonate of sodium, one per cent. of litharge, two per cent. of sesquioxide of iron, and ninety-four per cent. of water. The compound is then ready for the molds. As such compound is tamped into the molds it is moistened during the process of tamping with a solution of one-twentieth of the whole of the above of gum-shellac cut in the requisite amount of alcohol. All of the above proportions are found by weight.

When in the molds, the compound, moistened as above, is placed under pressure of about four hundred pounds to the square inch of upper surface, and allowed to remain there one day. After the stone is taken from the molds it is again moistened from three to five times a day during from three to five days by sprinkling thereon the first-named solution.

The stone are fit and ready for use in about six days from the molds, and become gradually a crystallized mass and more solid with age.

We claim as our invention and desire to secure by Letters Patent—

The compound described, and consisting of clean sand, six parts; stone-chippings, three parts; Portland cement, one part; gypsum, one part; and alumina, three parts, in combination with a solution of two per cent. of carbonate of magnesia, one per cent. of carbonate of sodium, one per cent. of litharge, two per cent. of sesquioxide of iron, and ninety-four per cent. of water, and with the further solution of one-twentieth of the above aggregate of gum-shellac cut in the necessary amount of alcohol, substantially as herein described, and for the purpose specified.

In testimony that we claim the foregoing as our own we affix our signatures in presence of two witnesses.

JOSEPH A. GREER.
PETER O'HAIR.

Witnesses:
J. J. CUSHING,
J. E. McPHERRAN.